United States Patent [19]
Datin et al.

[11] Patent Number: 4,981,395
[45] Date of Patent: Jan. 1, 1991

[54] PIPE POSITIONER

[76] Inventors: Michael C. Datin, 9 Vani Court, Westport, Conn. 06880; Timothy J. Datin, 60 Parmalee Hill Rd., Newtown, Conn. 06470

[21] Appl. No.: 488,985

[22] Filed: Mar. 5, 1990

[51] Int. Cl.$^5$ .............................................. F16L 1/00
[52] U.S. Cl. .................................... 405/154; 248/49; 405/158
[58] Field of Search ............... 405/154, 156, 158, 157, 405/170, 171; 248/49, 55; 294/104; 414/747

[56] References Cited

U.S. PATENT DOCUMENTS

| | | | |
|---|---|---|---|
| 2,176,921 | 10/1939 | Neff | 405/154 |
| 4,043,139 | 8/1977 | Scott | 405/154 |
| 4,166,544 | 9/1979 | Cecchi et al. | 414/747 |
| 4,218,044 | 8/1980 | Ikhsanov et al. | 405/154 X |
| 4,218,158 | 8/1980 | Tesson | 405/158 X |
| 4,265,566 | 5/1981 | Scodino | 248/49 X |
| 4,362,435 | 12/1982 | Henry | 294/104 |

Primary Examiner—Dennis L. Taylor

[57] ABSTRACT

A device to aid in the laying of pipes in a ditch in a position above the bottom thereof while gravel is partially put into the ditch. Then with gravel in the ditch supporting the pipe, the device is conveniently removed.

10 Claims, 2 Drawing Sheets

PIPE POSITIONER

BACKGROUND OF THE INVENTION

1. Field of the Invention

The invention relates to the laying of sections of pipe and especially laying the sections in a dug trench on a bed of particle material such as gravel. More particularly the field of the invention relates to laying sewer pipe or septic drain pipe in a trench in which it is necessary to align the sections of pipe on a bed of gravel or crushed rock.

2. Description of the Prior Art

When laying sections of pipe in a trench, it is first necessary to dig the trench to a depth below the level designed for the length of pipe. The gravel or crushed rock that provides a bed for the pipe is then filled in the bottom of the trench and the pipe sections are laid upon the gravel. It is understood that the sections must be aligned and often sloped at a fixed angle to provide running of the liquid through the pipe. The process of doing this is quite tedious in that first the gravel is filled into a portion of the trench and a section of pipe is laid on top of it so that the section is aligned with the preceding section. Often additional gravel must be filled in and it is a matter of placement and replacement of a section until the proper amount of gravel is underneath the section to support it in alignment with adjacent sections.

The problem of aligning sections of pipe in a bed of gravel on an individual basis as above described is long recognized and tools have been designed to place and hold the sections of pipe in a fixed predetermined position prior to filling in the bed of gravel or crushed stone. With the sections held in their correct positions the gravel material can then be filled into the ditch below and around the positioned pipe sections while they are being held in place. Examples of such pipe positioning tools are shown in McLaughlin U.S. Pat. No. 3,568,455 and Scott U.S. Pat. No. 4,043,139. The tools of these prior art patents have particular disadvantages that the present invention is designed to conveniently overcome. Both patents disclose pipe positioning tools that are driven into the ground at the bottom of the trench prior to the filling of gravel or other material. A pipe holder is provided that can hold the sections of pipe in a predetermined position for back filling of the gravel. Thereafter it is necessary to release the positioning tool from the pipe and pull it out of the ground for subsequent use. One problem arises from the fact that the tool in the ground must be pulled up through the bed of gravel which is a difficult and inconvenient process. In addition, these pipe positioning tools of the prior art cannot conveniently release the sections of pipe to permit the tool to be withdrawn. The present invention overcomes these and other disadvantages of the prior art pipe positioning tools.

OBJECTS OF THE INVENTION

One object of the present invention is to provide a tool for positioning sections of pipe in a trench in which the tool is readily and conveniently removed from its pipe positioning position after the gravel is deposited in the trench underneath and alongside the pipe.

Another object of the present invention is to provide a tool for laying pipes in a trench in which the pipes are securely held in position while the gravel is being filled into the trench without the need to insert the positioning tool into the ground at the bottom of the trench.

Another object of the present invention is to provide a pipe positioning tool for laying sections of pipe in a trench in which the pipe is readily and conveniently gripped to be held in place and then readily released so that the tool may be removed for subsequent use in a different location.

A still further object of the present invention is to provide a method and apparatus wherein the sectioned pipe-laying operation is done with a temporary support that can be conveniently removed after releasing the pipe which has been surrounded by a bed of particle material as gravel or crushed rock.

SUMMARY OF THE INVENTION

The above objects are achieved by a pipe positioning device that provides a cross arm designed and adapted to bridge a dug trench and be supported by the ground on opposite sides of the trench. The vertical positioning arm is pivotally and slidably secured to the cross arm and terminates in a pipe clamping mechanism. With the cross arm bridging a trench the positioning arm will depend down into the trench at any convenient level determined and set by the operator. The positioning arm being vertically and movably mounted to the cross arm will permit the positioning of the pipe at any desired elevation. In addition the pivoting movement will permit a vertical orientation of the positioning arm and therefore an accurate positioning of the pipe section.

With the section of pipe thus held in position, the gravel material is filled in under the pipe to permanently support it in its proper position and the pipe clamping device conveniently released to permit removal of the positioning tool for subsequent use.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which.

DESCRIPTION OF THE PREFERRED EMBODIMENT

Figure 1:
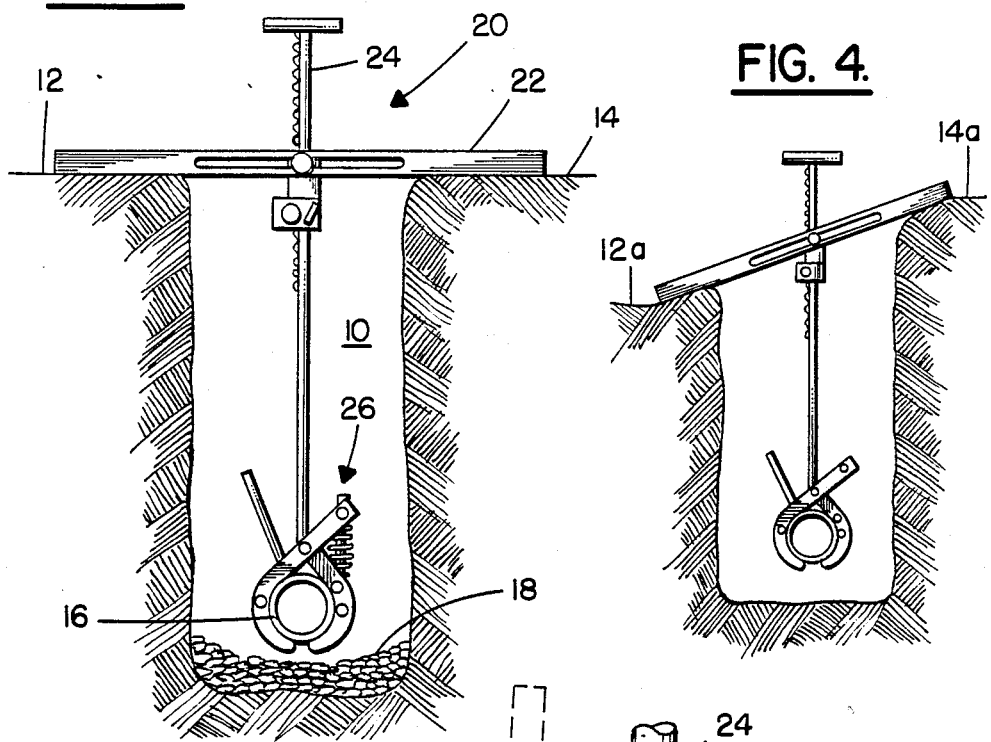
FIG. 1 illustrates the positioning device of the present invention in place spanning an embankment and holding a pipe in position.

Referring now to the drawings and more particularly to FIG. 1, there is shown a ditch 10 which has been dug in the ground and has a pair of embankments 12 and 14 on either side. The ditch is to receive a pipe comprised of a plurality of sections one of which is illustrated in cross section as 16 in FIG. 1. The pipes are to be laid a predetermined distance above the bottom of the ditch and must be temporarily held in position while the gravel or other particular material 18 is put into the bottom of the ditch. When the operation is complete the gravel will form a bed to support the line of pipe sections 16. The pipe positioner of the present invention serves to temporarily hold the sections of pipe 16 in their desired position prior to filling in the gravel which will ultimately support the pipes. The positioner 20 comprises a cross arm 22 which is positioned to span the ditch and be supported by the opposite embankments 12 and 14. Projections 13, 15 at opposite ends of cross arm 22 dig into the embankments and hold the cross arm in place. Suspension bar 24 hangs from the cross arm 22 and terminates in a pipe clamping mechanism generally indicated by 26. As will be described hereinafter, the suspension bar 24 joins cross arm 22 in a mechanism that permits the suspension bar to be moved both right and left and up and down as viewed in FIG. 1. This adjustability of the position of the suspension bar permits the operator to locate pipe section 16 at its proper location within the ditch 10.

Figure 2:
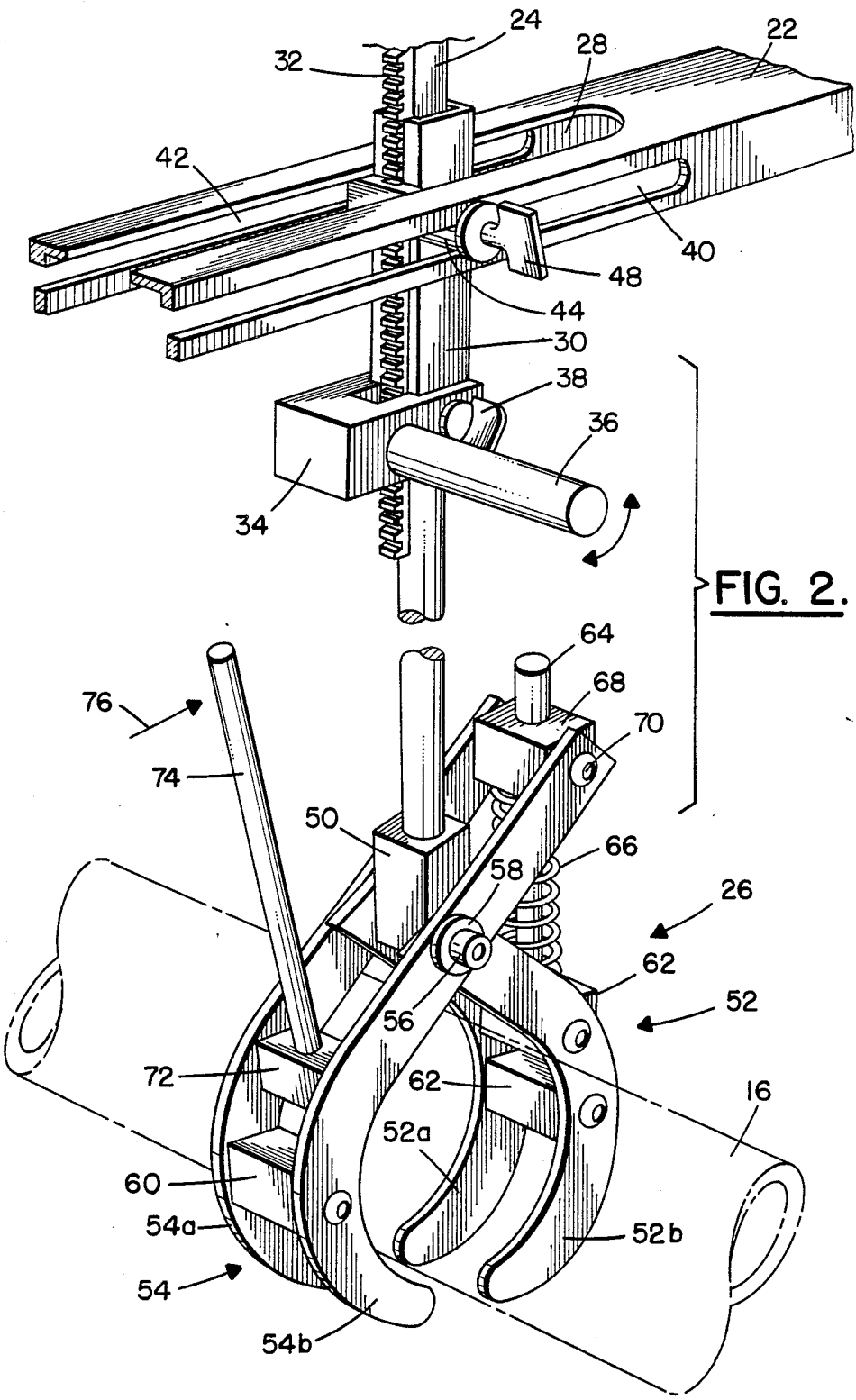
FIG. 2 is a perspective of the pipe positioner showing the details of the interconnection of the cross arm and suspension bar and also the details of the pipe clamping mechanism.

Referring now to FIG. 2, and in particular to the junction of cross arm 22 and suspension bar 24, it is seen that the cross arm is formed of a U-shaped member 20 which may be made of iron or other strong material. Along the center portion thereof a slot 28 is cut in the upper surface and receives member 30 which is somewhat u-shaped in cross section and receives suspension bar 24 which slides within member 30. The suspension bar may be made of round stock as shown and supports a elongated rack 32 which coincides with the open side of member 30 and extends therethrough. A U-bracket 34 is secured to member 30 by any suitable means such as by welding and includes within it a pinion gear (not shown in the drawings) that meshes with rack 32. The shaft of the pinion gear extends through member 34 to handle 36. Thus the rotation of handle 36 results in the rotation of the pinion gear and the movement up or down of rack 32. Inasmuch as the rack is secured to suspension bar 24, the latter is moved up and down within member 30 as pinion handle 35 is manually rotated. Thumb screw 38 extends through one side of member 34 and bears against suspension arm 24 when the thumb screw is tightened. Thus an operator can raise or lower the suspension bar by rotating handle 36 until the bar is at the desired position at which time he will tighten thumb screw 38 to maintain bar 32 in a fixed position relative to member 30 which is positioned within cross arm 32.

It is seen that a pair of slots 40, 42 are provided on the opposite sides of cross arm 22. These slots receive a pair of respective bosses, one of which 44 is shown in FIG. 2. A corresponding boss is located on the other side of member 30 and is received in slot 42. These bosses are integral with member 30 and prevent the latter from moving vertically with respect to cross arm 22. A thumb screw 48 is provided to be received within boss 44. Similarly, a corresponding thumb screw (not shown) on the other side of member 30 passes through slot 42 and is received in its corresponding boss. Thus it is seen that member 30, holding the suspension bar may be moved along slots 40 and 44 in a left and right direction as shown in the drawings. When member 30 and correspondingly the suspension bar is properly located in a lateral direction, the thumb screw 48 and its corresponding thumb screw on the other side of member 30 are tightened to retain the suspension bar in its lateral position.

The bottom end of suspension bar 24 holds the pipe clamping mechanism 26 as shown in FIG. 2. The bar 24 terminates in a rectangular block 50 which may be secured to the bar by welding or other suitable means. A stationary claw 52 is comprised of two plates 52a and 52b which are secured as by welding to opposite sides of block 50. A movable claw 54 comprised of plates 54a and 54b are held in place by a pin 56 which passes through block 50 and plates 52a and 52b of the fixed claw. Thus the movable claw 54 can pivot around screw 56 which is held in place by a nut 58. Spacer blocks 60 and 62 maintain the plates of the fixed and movable claws a fixed distance apart. An additional block 62 is positioned between the plates of the fixed claw and has an upstanding rod 64 secured thereto and surrounded by a compression spring 66 which bears against block 68 located between the upper ends of the plates 54a and 54b and held in place by screw 70.

It is seen then that the spring 66 in compression and bearing against block 68 urges the movable claw to rotate counter clockwise about pin 56 and thereby firmly grip the section of pipe 16. An additional block 72 is secured as by welding to the plates 54a, 54b of the movable claw and operates to release the clamping device from the pipe 16. When the operator desires to open the claw he moves handle 74 in the direction of the arrow 76 which pivots the movable claw 54 clockwise to release the clamping device from the pipe.

Figure 3:
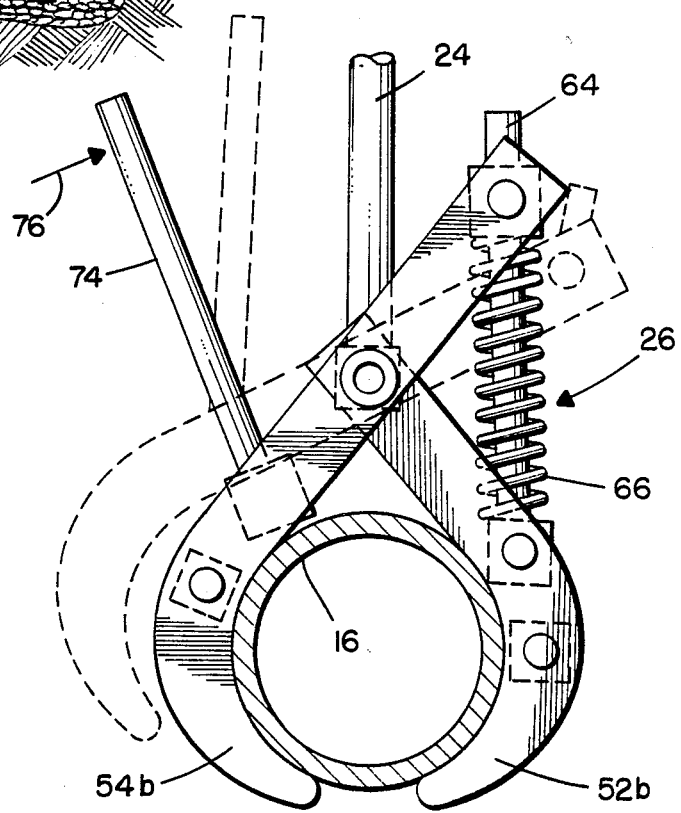
FIG. 3 is a side view of the pipe clamp mechanism illustrating the clamp position and the release position.

FIG. 3 illustrates the clamping device in the clamping position as shown in solid lines. The dotted line showing of the movable claw and its associated mechanism illustrates the clamping device in the released position whereby it can be withdrawn from around the pipe 16 after the latter is in place and supported by the bed of gravel.

It is seen that the present invention provides the mechanism for positioning sections of a pipe in their proper location within a dug out ditch prior to the gravel being placed into the ditch and ultimately hold the pipe in position. It is understood that a section of pipe may be held in place by a plurality of devices as illustrated in the drawings. Conventionally, a section of pipe is held in place by two pipe positioners. With the pipe in place the gravel is poured into the ditch to fill the bottom thereof up to the pipe at which time the clamping mechanism is opened and the suspension bar removed from the ditch.

Figure 4:
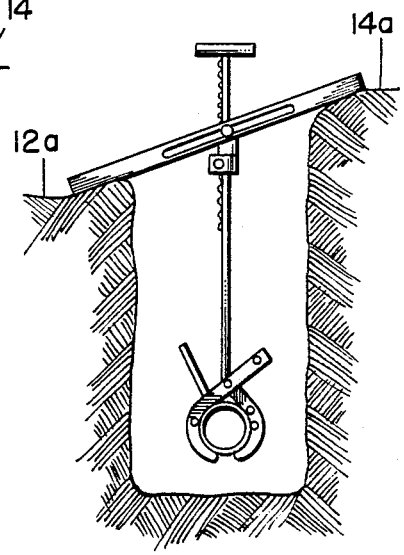
FIG. 4 is a view of the pipe positioner in place over a ditch similar to FIG. 1.

FIG. 4 illustrates the positioner in place in which the embankments are at different levels in which case the cross bar is at an angle determined by the embankment positions and the suspension bar is pivoted to a verticle position.

Having thus described the invention with particular reference to the preferred forms thereof, it will be obvious that various changes and modifications may be made therein without departing from the spirit and scope of the invention as defined in the appended claims.

What is claimed is:

1. A device for positioning sections of pipe in a trench comprising:
   a support arm adapted to span the width of a trench in which the ends thereof may be supported by opposite embankments of the trench;
   suspension bar means;
   means joining the support arm to the suspension bar means;
   means whereby the support arm and suspension bar are relatively pivotal;
   means whereby the suspension bar is movable vertically with respect to the support arm;

means whereby the suspension bar is movable along the support arm; and means secured to one end of the suspension bar to releasably hold a section of a pipe.

2. The device set forth in claim 1 in which the support arm is slotted and the means joining the support arm to the suspension bar means has means received in the support arm slot to permit the suspension arm to slide laterally with respect to the support arm.

3. The device set forth in claim 2 in which the suspension bar means is vertically slidable in the means joining the support arm to the suspension bar means.

4. The device set forth in claim 3 in which the means secured to one end of the suspension bar is a pipe clamping means adapted to assume a closed pipe clamping position and an open pipe releasing position.

5. A device for positioning a pipe in a trench comprising:

support arm means adopted to span the width of a trench in which the ends thereof may be supported by opposite embankments of the trench in a generally horizontal position;

suspension bar means;

coupling means to join the support arm means to the suspension bar means whereby the suspension bar means is held in a generally vertical position;

said support arm means having first slot means;

said coupling means having means received in the first slot means whereby the suspension bar means is movable in a generally horizontal direction along the support arm means;

said support arm having second slot means;

said coupling means having means received in the second slot means whereby the suspension bar means is movable vertically, generally perpendicular to the support arm means; and pipe clamping means secured to the end of the suspension bar means.

6. A device for positioning a pipe in an earthen trench comprising:

support arm means adopted to span the width of a trench and be supported at its opposite ends by opposite embankments of the trench;

suspension bar means;

coupling means to join the support arm means to the suspension bar means;

said coupling means having pivoting means whereby the support arm means and suspension bar means are relatively pivotal;

said coupling means having first movable means whereby the suspension bar means is movable along the support arm means;

said coupling means having a second movable means whereby the suspension bar means is movable with respect to the support arm means in a direction longitudinal of the suspension bar means; and pipe clamping means secured at one end of the suspension bar means.

7. The device as set forth in claim 6 in which the first movable means has first clamping means to clamp said first movable means in a desired fixed position to prevent movement of the suspension bar means along the support arm means; and the second movable has second clamping means to clamp said second movable means in a desired fixed position to prevent movement of the suspension bar means with respect to the support arm means in a direction longitudinal of the suspension bar means.

8. The device as set forth in claim 7 in which the clamping means includes means to maintain the clamping means in a first pipe clamping position and a second pipe release position.

9. The device as set forth in claim 8 in which said clamping means includes spring means to normally urge the clamping means in the first pipe clamping position and manually operable means to move the clamping means to the second pipe release position.

10. A device as set forth in claim 9 in which the coupling means includes rack and pinion means and manually operable means to control the movement of the suspension bar means with respect to the support arm means.

* * * * *